(12) United States Patent
Fernández Vieira

(10) Patent No.: US 7,686,344 B2
(45) Date of Patent: Mar. 30, 2010

(54) CURRENT INSULATION SYSTEM FOR FLUID SYSTEMS

(75) Inventor: Jesús Fernández Vieira, Madrid (ES)

(73) Assignee: Airbus Espana, S.L., Madrid (ES)

( * ) Notice: Subject to any disclaimer, the term of this patent is extended or adjusted under 35 U.S.C. 154(b) by 550 days.

(21) Appl. No.: 11/516,033

(22) Filed: Sep. 5, 2006

(65) Prior Publication Data

US 2009/0071676 A1    Mar. 19, 2009

(30) Foreign Application Priority Data

Jun. 22, 2006    (WO) ............... PCT/ES2006/070088

(51) Int. Cl.
*F16L 11/12* (2006.01)
(52) U.S. Cl. .............. 285/48; 285/50; 285/53; 361/218; 174/85
(58) Field of Classification Search .......... 285/55, 285/48, 50, 53, 397; 361/215, 216, 218; 439/100, 192; 174/84 S, 85
See application file for complete search history.

(56) References Cited

U.S. PATENT DOCUMENTS

| | | | | |
|---|---|---|---|---|
| 873,215 A | * | 12/1907 | Davis ........................ | 285/53 |
| 1,888,241 A | * | 11/1932 | Rah ........................... | 285/50 |
| 3,484,121 A | * | 12/1969 | Quinton ..................... | 285/242 |
| 3,916,954 A | * | 11/1975 | Hochhausen ............... | 138/149 |
| 4,277,091 A | * | 7/1981 | Hunter ....................... | 285/55 |
| 4,346,922 A | * | 8/1982 | Ohtsuga et al. ............ | 285/109 |
| 5,944,359 A | * | 8/1999 | Andronaco ................. | 285/55 |
| 6,126,206 A | * | 10/2000 | Topf, Jr. .................... | 285/109 |
| 6,226,855 B1 | * | 5/2001 | Maine ........................ | 285/55 |
| 6,692,039 B2 | * | 2/2004 | Topf, Jr. .................... | 285/370 |

* cited by examiner

*Primary Examiner*—David E Bochna
(74) *Attorney, Agent, or Firm*—Ladas and Parry LLP

(57) ABSTRACT

An electrical insulation system for a linear element forming part of a fluid system subjected to risks of possible external electrical discharges, such as an aircraft fuel system, using an insulating insert (12) between two parts (14, 16) of said linear element, consisting of providing said parts (14, 16) with grooved edges and in forming the insulating insert (12) between them preferably by an injection technique, such that the insulating insert (12) provides an inner duct for the passage of fluid between said parts (14, 16) and covers said grooved edges, assuring the leak-tight joint of the insulating insert (12) with said parts (14, 16).

9 Claims, 1 Drawing Sheet

CURRENT INSULATION SYSTEM FOR FLUID SYSTEMS

FIELD OF THE INVENTION

The invention relates to an insulation system for fluid systems subjected to risks of possible electrical discharges using insulating inserts between parts of the linear elements of the fluid system, and more specifically to an insulation system for protecting aircraft fuel systems against electrical discharges caused by lightening striking fuel deposits made of materials with low electrical conductivity.

BACKGROUND OF THE INVENTION

Composite materials provide high electrical resistance in comparison with metallic materials. The latter have traditionally been used in the field of aeronautics for the manufacture of structures intended for fuel storage given their mechanical characteristics in relation to the weight of these materials.

The high electrical resistance inherent to composite materials causes a highly relevant induction effect in internal fuel tank systems. Said effect induces internal electrical currents that may give way to catastrophic failures or phenomena for the overall structural integrity.

The phenomena related to moderate or severe electrical discharges occurring in the case of lightening striking which must be avoided in a structure made of a material with low electrical conductivity so as to assure its structural integrity/ malfunction of any of the critical electrical equipment/electric arcs inside the tank:

Hot spots: the high density of current in certain specific locations of the structure such as joints or intersection elements may generate high temperature spots. If this temperature exceeds 200° C. (point of auto-ignition of the fuel considered by FAA/JAA authorities), the fuel may reach its ignition point.

Electric arcs (sparking): the flow of current through materials with different resistances and in geometrically spaced locations may cause discharges in the form of an electric arc (potential difference) and causing the ignition of the fuel/ inflammable liquid contained in the structure.

Electrical equipment malfunction: the electrical discharges caused by lightening striking give way to high levels of current circulating through the outer structure and may therefore introduce electric current through the internal systems either by shunting or induction. These effects are capable of causing critical equipment malfunction, generating a catastrophic failure.

Patent application PCT/ES05/070133 of Airbus describes a method for protecting the assembly of metallic devices assembled inside a fuel tank, completely or partially manufactured with composite materials, for protection against electrical discharges, in which insulating inserts are required in the installation lines for the fuel, ventilation, etc., such that they are subdivided into parts insulated from one another.

This invention relates to an insulating insert of the type that can be used both in locations with little free space and in areas of insulating floating elements with greater length.

SUMMARY OF THE INVENTION

This invention proposes an electrical insulation system for a linear element that is part of a fluid system subjected to risks of possible external electrical discharges using an insulating insert between two parts of said linear element, according to which said parts are provided with grooved edges and the insulating insert is a piece of insulating material that is formed between said parts such that it provides an internal duct for the passage of fluid between them and covers said grooved edges, assuring the leak-tight joint of the insulating insert with the two parts of the linear element.

The insulating insert is preferably formed by means of an injection technique using a suitable mold.

The linear elements to which the insulation system is applied is preferably a metal pipe for the passage of fuel and the grooved edges of the parts between which the insulating insert is located include diametric grooves so as to facilitate the coupling of the insulating insert and longitudinal grooves to prevent the rotation thereof.

The insulation system object of this invention is applicable to fuel and ventilation pipes forming part of fuel systems installed in aircraft when it is necessary to stop the current or else insulate sections of the installation where the passage thereof is foreseen.

An advantage of the system object of the present invention is that the insulating insert is joined to the two parts of the linear element without needing mechanical jointing elements such as bolts, rivets, washers or nuts.

Another advantage of the system object of the present invention is the leak-tight nature of the joint between the insulating insert and the two parts of the linear element, without needing specific means for it such as gaskets or rubber seals with the subsequent reduction in maintenance costs.

Another advantage of the system object of this invention is the reduction in manufacturing and assembly costs as the machined pieces made of difficult to elaborate insulating material are eliminated.

Another advantage of the object of this invention is the reduction in weight resulting from not using specific jointing and leak-tight elements.

Other features and advantages of this invention shall be understood from the detailed and illustrated description of the object with the attached figures.

DETAILED DESCRIPTION OF THE DRAWINGS

DETAILED DESCRIPTION OF THE INVENTION

Figure 1:
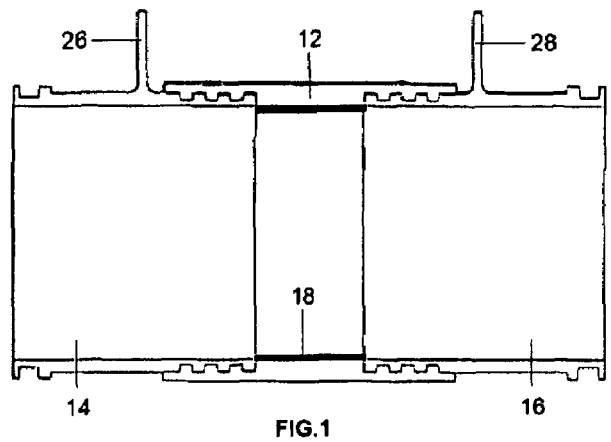
FIG. 1 shows a sectional view of two parts of a pipe with an insulating insert according to the system object of this invention.
Figure 2:
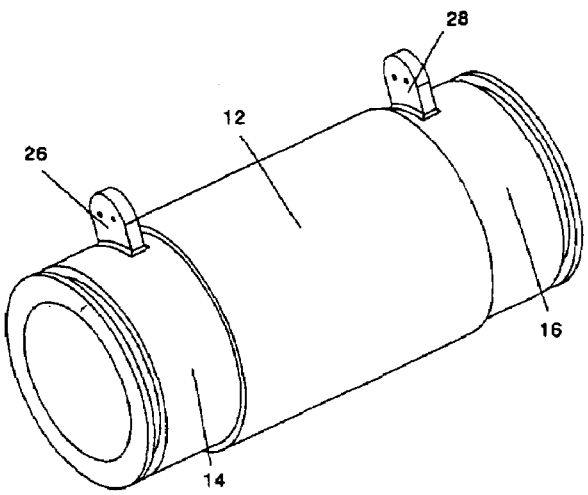
FIG. 2 shows a perspective view of a pipe with an insulating insert according to the system object of this invention.
Figure 3:
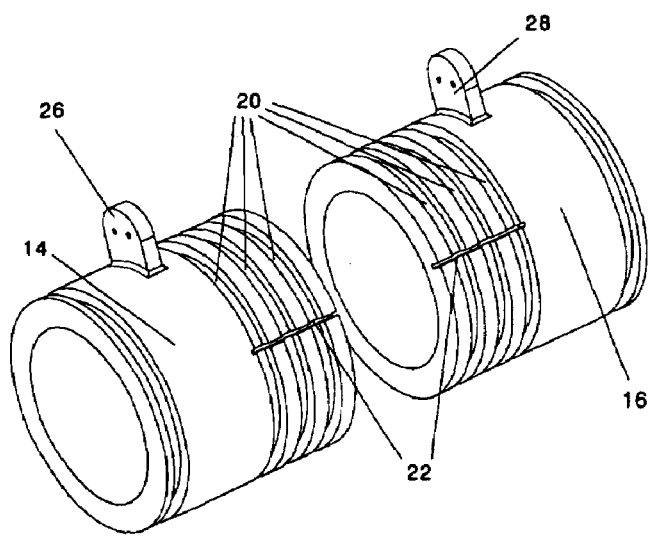
FIG. 3 shows a perspective view of the two parts of the pipe before forming the insulating insert between them.

In FIGS. 1, 2 and 3, which show a preferred embodiment of the invention, it can be seen that the insulating insert 12 is a piece joined in a leak-tight manner to parts 14, 16 of a metal pipe. Such joint occurs when the insulating insert 12 is formed between said parts 14, 16 by means of any suitable technique. Therefore specific jointing and/or leak-tight elements are not used.

A suitable technique is injection using a suitable mold (not shown) resulting in a cylindrical-shaped insulating insert 12. The injection can be carried out either externally or internally, preventing internal stepping according to needs. Nylon, polyamide and PEEK are some of the preferred insulating materials that can be used.

The edges of parts 14, 16 of the metal pipe are grooved so as to facilitate the leak-tight joint of the insulating insert 12 formed in situ. For the purpose of this invention, the expression "grooved edges" must be understood in the broadest sense, including any type of striated structure allowing the expressed purpose.

In the preferred embodiment shown in the Figures, parts 14, 16 of the metal pipe have edges with diametric grooves 20 and longitudinal grooves 22 so as to facilitate the fixing of the insulating insert 12.

The insulating insert 12 must be sized such that it prevents the passage of electric current when it circulates through the fuel or ventilation pipes in which it is inserted.

From the technical point of view, said insert is subjected to insulation tests during which it is subjected to a potential difference between the ends of between 500 VDC and 1000 VDC, providing electrical insulation of the order of 100 Mega ohms as a minimum requirement.

In this sense it is estimated that the minimum length of the area 18 of the insulating insert 12 located between parts 14, 16 of the metal pipe must be at least 25 mm so as to comply with the requirements for insulation against lightening and static current.

As previously mentioned, the insulating insert 12 is applicable to fuel installations in which the intention is to insulate the current in sections or to apply a single bonding point philosophy.

With the required material and dimensions it is also applicable to aircraft systems other than fuel systems, such as for example the hydraulic or pneumatic circuit as it has not mechanical jointing elements (which would have to be provided with systems for withstanding the high pressures) and expendable jointing elements (gaskets) resistant to different fluids (hydraulic fluids for example).

In the case of fuel systems, parts 14, 16 of the metal pipe must include elements 26, 28 for installing a bonding point since a double bonding point is required in these systems.

These elements 26, 28 will be machined at said parts 14, 16 with the minimum thickness necessary and provided with two bores so as to be able to give them electrical continuity with the rest of the corresponding fluid system line.

Modifications can be introduced in the preferred embodiment just described that are comprised within the scope defined by the following claims.

The invention claimed is:

1. An electrical insulation system for a linear element forming part of a fluid system subjected to risks of possible external electrical discharges, the electrical insulation system comprising an insulation insert (12) between two parts (14, 16) of said linear element, each part having an external surface, characterized in that:

a) said parts (14, 16) have grooved edges comprising diametric grooves and longitudinal grooves on said external surface, b) the insulating insert (12) is a piece of insulating material formed between said parts (14, 16) such that it provides an internal duct for the passage of fluid between said parts (14, 16) and covers said grooved edges, assuring the leak-tight joint of the insulating insert (12) with said parts (14, 16) without needing specific sealing means for it.

2. An electrical insulation system for a linear element forming part of a fluid system according to claim 1, wherein the formation of the insulating insert (12) is carried out by means of an injection technique using a suitable mold.

3. An electrical insulation system for a linear element forming part of a fluid system according to claim 1, wherein the material of the insulating insert (12) is chosen from PEEK, polyamide, and nylon.

4. An electrical insulation system for a linear element forming part of a fluid system according to claim 1, wherein the area (18) of the insulating insert (12) located between the edges of said part (14, 16) has a minimum length of 25 mm.

5. An electrical system for a linear element forming part of a fluid system according to claim 1, wherein the linear element is a metal pipe.

6. An electrical insulation system for a linear element forming part of a fluid system according to claim 1, wherein the fluid system belongs to an aircraft.

7. An electrical insulation system for a linear element forming part of a fluid system according to claim 6, wherein the fluid system is a fuel system.

8. An electrical insulation system for a linear element forming part of a fluid system according to claim 7, wherein said parts (14, 16) include bonding point elements (26, 28)

9. An aircraft pipe system for transporting fluids within an aircraft comprising electrically conductive pipe units electrically insulated from each other and having located between such pipe units an electrical insulating element of at least 25 mm length wherein said pipe units have grooved edges comprising diametric grooves and longitudinal grooves; and said insulating insert (12) is a piece of insulating material formed between said pipe units (14, 16) such that it provides an internal duct for the passage of fluid between said parts (14, 16) and covers said grooved edges, assuring the leak-tight joint of the insulating insert (12) with said parts (14, 16)

* * * * *